US008781222B2

(12) United States Patent
Ferguson (10) Patent No.: US 8,781,222 B2
(45) Date of Patent: Jul. 15, 2014

(54) METHOD AND APPARATUS FOR AUTOMATIC ILLUMINANT COMPENSATION IN VIDEO SURVEILLANCE

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 749 days.

(21) Appl. No.: 12/635,537

(22) Filed: Dec. 10, 2009

(65) Prior Publication Data

US 2010/0150409 A1    Jun. 17, 2010

Related U.S. Application Data

(60) Provisional application No. 61/122,221, filed on Dec. 12, 2008.

(51) Int. Cl.
*G06K 9/00*        (2006.01)

(52) U.S. Cl.
USPC .......................................... 382/167; 382/162

(58) Field of Classification Search
None
See application file for complete search history.

(56) References Cited

U.S. PATENT DOCUMENTS

| 4,274,107 | A | * | 6/1981 | Tamura et al. ............. 348/225.1 |
| 5,276,779 | A | * | 1/1994 | Statt ................................ 358/1.9 |
| 5,771,312 | A | | 6/1998 | Spitzer |
| 6,128,397 | A | * | 10/2000 | Baluja et al. .................. 382/118 |
| 6,931,152 | B2 | | 8/2005 | Spitzer |
| 6,940,545 | B1 | * | 9/2005 | Ray et al. .................... 348/222.1 |
| 6,941,017 | B2 | | 9/2005 | Ferguson |
| 7,489,814 | B2 | | 2/2009 | Spitzer et al. |
| 7,609,318 | B2 | | 10/2009 | Zador |
| 7,684,080 | B2 | * | 3/2010 | Borg .............................. 358/1.9 |
| 7,848,549 | B2 | * | 12/2010 | Steinberg et al. ............. 382/118 |
| 8,018,494 | B2 | * | 9/2011 | Yokomitsu et al. ...... 348/208.14 |
| 8,089,525 | B2 | * | 1/2012 | Takayama .................. 348/222.1 |
| 8,106,961 | B2 | * | 1/2012 | Nakamura .................. 348/223.1 |
| 8,155,397 | B2 | * | 4/2012 | Bigioi et al. .................. 382/118 |
| 2002/0186894 | A1 | | 12/2002 | Ferguson |
| 2003/0053688 | A1 | | 3/2003 | Spitzer |

(Continued)

FOREIGN PATENT DOCUMENTS

| EP | 1771013 A2 | 4/2007 |
| JP | 9219868 A | 8/1997 |

(Continued)

OTHER PUBLICATIONS

U.S. Appl. No. 12/635,456, filed Dec. 10, 2009.

(Continued)

*Primary Examiner* — Sean Motsinger
(74) *Attorney, Agent, or Firm* — Michael A. Nelson; Marger Johnson & McCollom PC (57) ABSTRACT

Embodiments of the invention include systems and methods for automatically detecting persons and/or other objects in a video signal. Automatic color compensation is applied to the video signal based on measured color of a reference area of the video signal. Generally the reference area is an area of the video signal that does not change often over time. The color compensated video signal is then analyzed for the appearance of objects and persons. In some instances the persons are identified using facial or other type of recognition. Counters or other trackers may provide real-time information, such as how many people are currently on a particular floor of a building.

20 Claims, 5 Drawing Sheets

(56) References Cited

U.S. PATENT DOCUMENTS

| | | |
|---|---|---|
| 2003/0152284 A1 | 8/2003 | Ferguson |
| 2004/0135898 A1 | 7/2004 | Zador |
| 2004/0165086 A1 | 8/2004 | Spitzer |
| 2005/0031173 A1* | 2/2005 | Hwang .................. 382/118 |
| 2006/0210167 A1* | 9/2006 | Inoue et al. .............. 382/190 |
| 2007/0098253 A1* | 5/2007 | Crespi et al. ............. 382/159 |
| 2007/0200933 A1 | 8/2007 | Watanabe et al. |
| 2007/0262985 A1* | 11/2007 | Watanabe et al. ......... 345/420 |
| 2008/0008360 A1 | 1/2008 | Pattikonda |
| 2008/0252748 A1 | 10/2008 | Meka et al. |
| 2009/0002517 A1* | 1/2009 | Yokomitsu et al. ........ 348/223.1 |
| 2009/0201309 A1* | 8/2009 | Demos .................... 345/589 |
| 2009/0225226 A1 | 9/2009 | Kakuta |
| 2010/0135591 A1 | 6/2010 | Zador |
| 2011/0038535 A1* | 2/2011 | Wang et al. .............. 382/164 |

FOREIGN PATENT DOCUMENTS

| | | |
|---|---|---|
| JP | 10210487 A | 8/1998 |
| JP | 2006042152 A | 2/2006 |
| JP | 2006295839 A | 10/2006 |
| JP | 2007036462 A | 2/2007 |
| JP | 2007184950 A | 7/2007 |
| JP | 2007264860 A | 10/2007 |
| JP | 2008206055 A | 9/2008 |
| WO | 2006/006081 A2 | 1/2006 |

OTHER PUBLICATIONS

Garret M. Johnson: "Using Color Appearance in Image Quality Metrics," Proceedings of the Second International Workshop on Video Processing and Quality Metrics for Consumer Electronics, Jan. 31, 2006, Retrieved from the Internet:URL:http://enpub.fulton.asu.edu/resp/vpqm2006/papers06/326.pdf [retrieved on May 28, 2010].

* cited by examiner

METHOD AND APPARATUS FOR AUTOMATIC ILLUMINANT COMPENSATION IN VIDEO SURVEILLANCE

CROSS REFERENCE TO RELATED APPLICATIONS

This application claims the benefit of U.S. Provisional Application No. 61/122,221 filed Dec. 12, 2008, which is incorporated herein by reference.

This application is related to U.S. application Ser. No. 12/635,456, filed Dec. 10, 2009, entitled METHODS AND APPARATUS FOR IMPLEMENTING MOVING IMAGE COLOR APPEARANCE MODEL FOR VIDEO QUALITY RATINGS PREDICTION, which claims the benefit of U.S. Provisional Application No. 61/122,221 filed Dec. 12, 2008, which is incorporated herein by reference.

FIELD OF THE INVENTION

This disclosure is related to video surveillance, and, more particularly to methods and systems of enhanced object detection through illuminant compensation in video surveillance.

BACKGROUND

One of many benefits to Moore's law is that the price of technology decreases over time. A particular market segment taking advantage of this benefit is the video market, including video surveillance.

Early uses of video surveillance included a human visually inspecting a display from a video camera, continuously watching for an unusual scene. Recordings were made and stored for later review, if the need arose. One problem in this usage model is that the person watching the display could fatigue as long periods of time would often pass with no change in the displayed scene. Later surveillance processes included automatic monitoring of video, either live or previously recorded, where a machine compared frames of a video display to previous frames, and signaled when a change occurred. Such a change could be a person walking within the scene being monitored, for example. Yet later processes include automatically tracking personnel entering and exiting the building, sometimes including face-recognition features to determine identity.

These automated systems are only as good as the quality of the underlying video signal, however. Many times surveillance is performed with low quality cameras, in an effort for maximum area coverage with a minimum of expense. All qualities of cameras, but especially lower quality cameras, are affected by ambient video conditions, such as variable light sources during different times of day. Additionally, other factors such as colored or flashing lights within the video can make it difficult for automatic analysis of the live or recorded video.

Embodiments of the invention address these and other limitations in the prior art.

DETAILED DESCRIPTION

Color perception adaptation in human eyes causes a given constant physical light stimulus to appear to have a different color when the surround or environment changes, or when viewed after seeing other colors. In general, dynamic light stimuli generally causes perceptions of given static light stimuli to appear to change due to changes in space and/or time. This apparent change of color appearance due to adaptation has a time course that depends on a number of stimulus conditions.

Cognitive discounting of illumination and white point allows humans to view an apple illuminated by red light only and still determine if the apple is red or green. In some applications, it is desirable to discount this type of overall color shift, while in other cases discounting is undesirable.

Depending on the agility of one's gaze, perceptual color adaptation can become very localized, for example if one stares at a fixed point for a relatively long time the sensation of color is reduced. Alternatively, color adaptation can become primarily global based on the biases such as the non-white illumination or other color bias from the image. Localized color adaptation effects from long gazes at fixed points can cause color after-images that in effect are a result of desensitization of the eye to certain colors. In some applications the prediction of these localized adaptation affects, which can be most dramatic, are important for predicting video quality. In other applications, perhaps only the global effect is of interest.

The International Commission on Illumination, abbreviated as CIE because of its official French name of Commission internationale de l'éclairage, has created several improved color appearance models (CAMs) since the original CIE Luv was introduced in 1976. The current, and most accurate CAM is the international standard CAM known as CIECAM02, which is incorporated by reference herein. A subset of the CIECAM02 development team has developed still image color appearance models based on CIECAM02: iCAM and iCAM06, both of which include spatial processing for images, the latter with extra processing to handle high dynamic luminance range. These are not international standards, however, and do not account for changes in viewing distance or similar factors affecting spatial response. Meanwhile, CIECAM02 has found wide acceptance for its original use, which was primarily for reflected light applications such as matching paints in different lighting environments. The reflected light application represents a smaller gamut than direct light, excluding the extremes in saturation and luminance levels. For current broadcast video standards and the maximum luminance output of most commercial display technologies, however, the video gamut mostly overlaps the CIECAM02 target. While CIECAM02 takes into account color adaptation, it requires an input of the level of adaptation and does not include any temporal dimension to the input or output. In other words, CIECAM02 is designed to work with static color patches having static surround and static lighting.

A highly adaptable moving picture color appearance model improves methods of predicting subjective video quality, allowing the comparison of dissimilar displays, image sizes, viewing environments, frame rates and video quality classes. The combination of adaptable spatiotemporal luminance response and the CIECAM02 "static patch" predicting color appearance model is detailed, and additional techniques using a new temporal surround filter. Example model temporal surround response test results compare well with human vision perceptual response.

Figure 1:
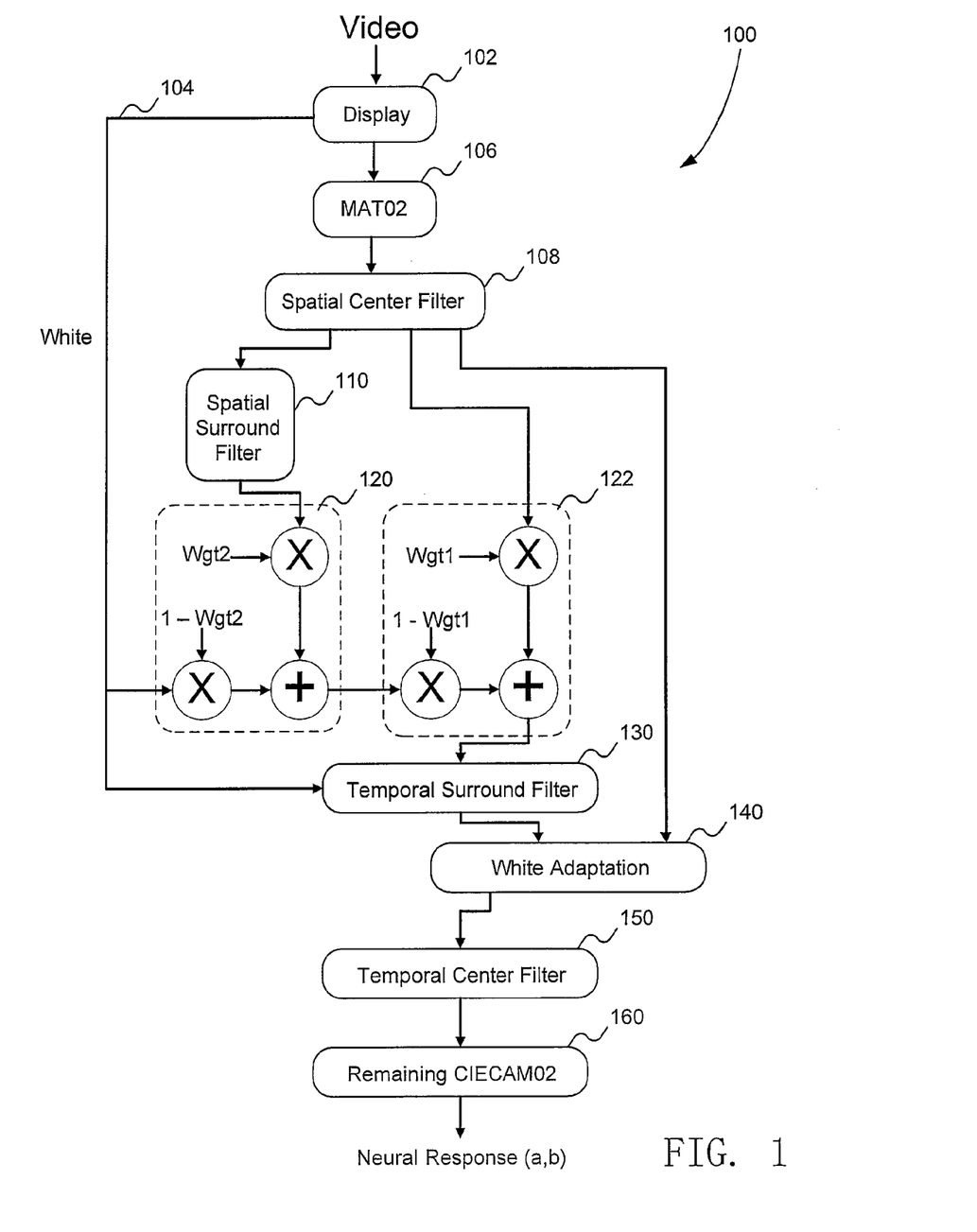
FIG. 1. is a functional block diagram of a system that implements a color analysis for moving images according to embodiments of the invention.

FIG. 1. is a functional block diagram of a system 100 that implements a color analysis for moving images according to embodiments of the invention. In general, a video signal is applied to the system 100 which generates a value, or series of values called a Neural Response. The neural response reflects how a person rating the video signal would rate the quality of the video signal relative to an original video signal.

The system 100 generally follows a CIECAM02 process to obtain at least two channel {a,b} (& "orthogonal" {ac,bc}, though no net advantage was seen) color response. Different from the traditional process, the system 100 includes appropriate adaptive spatial and temporal processing to account for color perception of moving images, and further includes controls for levels of cognitive discounting and color adaptation localization.

Initially, a video signal is applied to a simulated display 102, which, in some embodiments, produces a tristimulus CIE1931 XYZ output based on the type of display it is simulating, such as CRT, LCD, DLP, etc. A portion of simulated output from the simulated display 102 includes a "white" component value 104, which includes factors for the white values from the display 102 combined with a standard white value as well as ambient white. The white component value is provided to a temporal surround filter 130, described in detail below, as well as to a mix controller 120, also described below.

The output from simulated display 102 is converted through a conversion matrix 106, such as an MAT02 matrix, into pre-adapted RGB cone responses, which are then fed to a spatial center filter 108. Because each of the separate cone responses is separately filtered, there are three spatial center filters 108 in the system 100 depicted in FIG. 1, one each for the Red, Greed, and Blue cone responses.

The spatial center filters 108 may be set to produce a $2^{nd}$ order linear (non-adaptive) mirrored IIR filter response as illustrated below in Table 1.

TABLE 1

Spatial Center Filter: 2nd order linear (non-adaptive) mirrored IIR filter:
@ 32 Samples/deg:
  Range of ~calibrated coefficients (3 possible sets):
    b0rsc = b0gsc = 0.357071, b0bsc = 0.214243
    OR
    b0rsc = 0.357071 OR 0.321364 OR 0.321364
    b0gsc = 0.357071 OR 0.257091 OR 0.257091
    b0bsc = 0.214243 OR 0.205673 OR 0.143971

The cone responses passed through the spatial center filter 108 are then used as inputs to a spatial surround filter 110. Again, there are three separate spatial surround filters 110, one each for the Red, Green and Blue signals. Similar to the mix controller 120, mentioned above, outputs from the spatial center filters 108 are provided to a mix controller 122, which, in conjunction with the previously mentioned mix controller 120, provide a user with the ability to control how much weighting effect is provided to the inputs of the temporal surround filter 130, which is described in detail with reference to FIG. 2.

Output from the main filters 108, 110, 130 in the system illustrated in FIG. 1 are further modified by a white adaptation circuit 140, which produces a white adapted cone response for each color channel. These cone responses are then fed to a temporal center filter 150 for a final filtering step. In some embodiments the spatial center filter 108 and the temporal center filter 150 may be combined into a common filter. As illustrated by 160, the system 100 may then apply the remainder of the CIECAM02 processes to finally produce the desired Neural Response.

In the system 100 of FIG. 1, the filters 108, 110, and 130 are applied as aggregate or "lumped" spatial and/or temporal response as an approximation of the combination of spatial and temporal response of each anatomical component of the human vision system. If the static response of CIECAM02 is to remain unchanged, this aggregation is maintained to prevent non-linearities of subsequent CIECAM02 processing from creating unwanted artifacts such as rectification of intermediate responses.

With reference back to the mix controllers 120, 122, these controllers allow a user to precisely control how much effect to apply from a pair of input signals as a combined output signal. For instance, to control effects of the surround vs. white point and ambient factors, the mix controller 120 includes inputs of the white component value 104 from the display 102, as well as an output from the spatial surround filter 110. The "White" input to the mix controller 120 represents the pre-adapted RGB cone responses to the combined display white and ambient illumination XYZ light combination. By setting the values for a weighting value "wgt2," the user determines how much of a filtered response from the spatial surround filter 110 is sent to the mix controller 122. The user may set the mix controller 120 such that the white value 104 is 100% dominant and the output from the spatial surround filter 110 is 0% dominant. For pure display and ambient white point adaptation wgt2=0, while for pure spatial surround (each channel normalized to Yw) adaptation, wgt2=1. Other settings allow the user to select any combination value, simply by selecting the appropriate weight value wgt2. Conventional use of CIECAM02 would correspond to wgt1=0, wgt2=0, ambient=0, display white=illuminant.

Similarly, with reference to the mix controller 122, to control local vs. global color adaptation, the user may set the weighting value wgt1 to select the mix value of the output from the spatial center filter 108 and the output from the previously set mix output from the mix controller 120, to produce a controlled mixed input to the temporal surround filter 130. The spatial center filter output 108 connects to both the spatial surround filter 130 and two other inputs: the pre-adapted cone response input to the white adaptation circuit 140 portion of CIECAM02 (responsible for color adaptation), and the weighting mechanism, via the weighting value wgt1, in the mix controller 120, to control how much of local vs. global spatial aspect of the adaptation is used. Thus wgt1 controls localization of spatial color adaptation. This reflects effects of fixated vs. roaming gaze. For minimum (no) local color adaptation (after-images), wgt1=0, while for maximum wgt1=1.

Cognitive discounting, which is the ability to compensate for the illuminant, display white, ambient illumination, etc. when identifying colors, may be controlled by a third weighting, termed "wgt3" but not illustrated in FIG. 1. For this compensation, the "white" input to the controller 120 may be cross-faded to Rw'=Gw'=Bw'=Yw (equivalent to adaptation parameter D=0 in CIECAM02) by setting wgt3=1, where Rw'=wgt3*Yw+(1−wgt3)*Rw, and likewise for Gw and Bw.

The temporal surround filter 130 is useful for several reasons. First, CIECAM02 already has a mechanism to take into account fixed adaptation relative to "surround" and/or the illuminant, given the percentage of adaptation. One input to CIECAM02 that in part controls adaptation is "adaptation white" {Rw, Gw, Bw}, used to modify the cone responses according to instantaneous level of adaptation. Likewise in both CIECAM02 and in another reference entitled "An Adaptable Human Vision Model for Subjective Video Quality Rating Prediction Among CIF, SD, HD, AND E-CINEMA," by Kevin Ferguson, published in Proceedings of the Third International Workshop on Video Processing and Quality Metrics for Consumer Products, January, 2007, and incorporated by reference herein, the surround channel is used to modify the center channel to produce the primary adapted spatiotemporal response. So as to leave CIECAM02 static response unchanged, in the system 100 of FIG. 1, the temporal processing is applied to the input for adaptation white processing 140, and thus is treated as the overall surround channel. Recall, too, that the temporal adaptation filter model (as well as all spatial and temporal filtering) is applied to CIECAM02 after image light stimulus is converted into the three pre-adapted (RGB) cone responses in the matrix 106 above.

For each channel, described above, the composite temporal surround filter is a parallel combination of the adaptive integrator based filters mentioned above.

Figure 2:
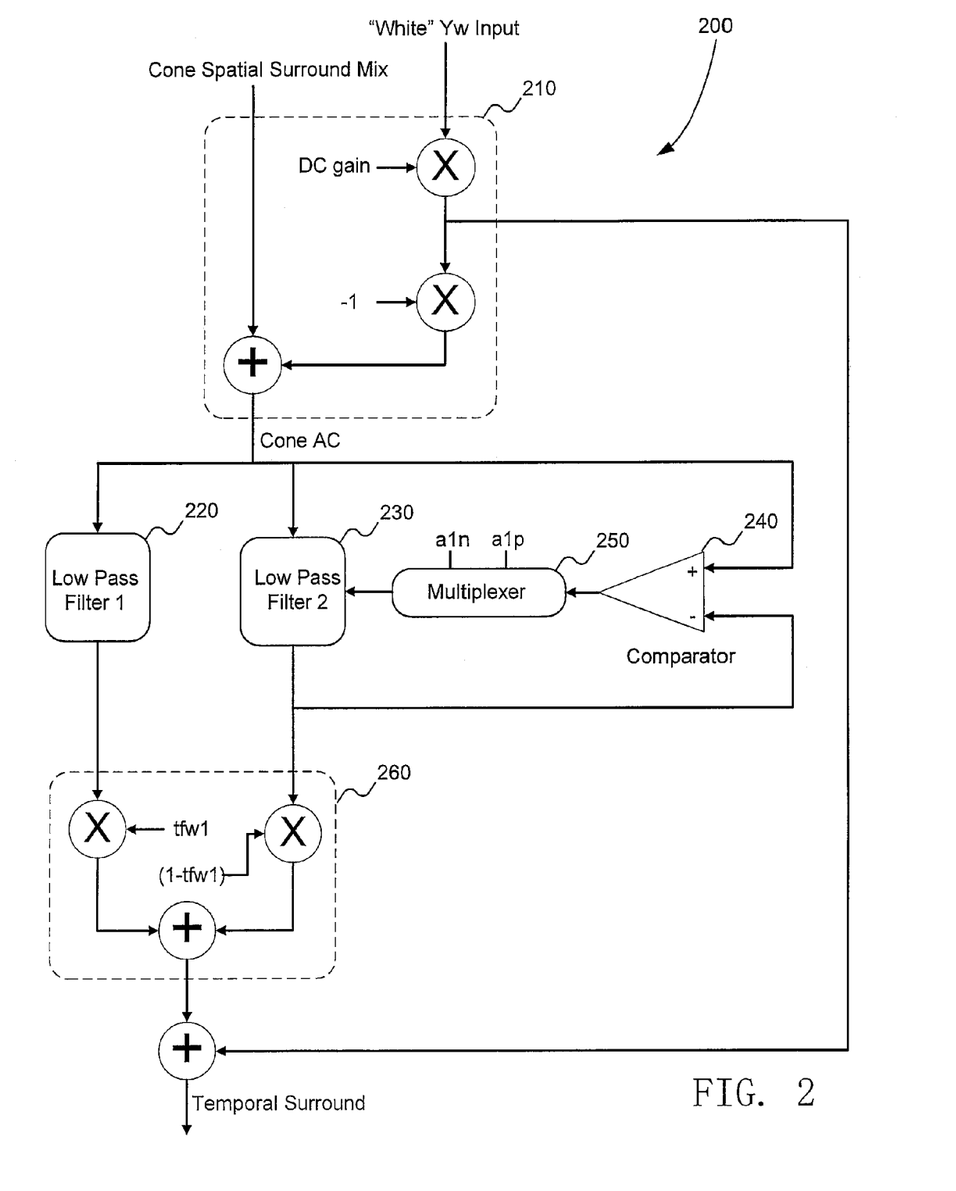
FIG. 2 is a functional block diagram of a temporal processing component of the system of FIG. 1 according to embodiments of the invention.

FIG. 2 is a functional block diagram of an example temporal surround filter 130 of FIG. 1 giving the description in further detail.

A surround filter 200 includes a "Cone Spatial Surround Mix" input, which was created by the sums of weighted inputs (as described with reference to FIG. 1) to account for localization of color adaptation and cognitive discounting, is a set of weighted cone responses (a channel each of R, G and B).

A "White" Yw input is the Y portion of the white input (as per CIECAM02). Yw may be either directly input from the display model 104 (FIG. 1) or may be converted back to Yw from the white RGB, otherwise known for example in CIECAM02 as Rw, Gw, Bw. This "White" Yw input is weighted by a "DC gain" factor, for example 0.48, and subtracted from each of the three "Cone Spatial Surround Mix" response inputs in a white processor 210. The result is pre-temporal surround filtered differential or "AC" components of the "Cone Spatial Surround Mix" response. Each channel represents the difference in respective cone response from intensity scaled "adaptation white."

This response is fed to two low-pass filters (LPF), 220, 230, which may be adaptive integrator based IIR low-pass filters. These filters 220, 230 are used in parallel to filter the differential color signals. The LPF 220 is a slow first LPF, which may be an instantiation of the same or similar adaptive temporal surround filter generally used in the Ferguson reference incorporated above, only having updated parameters for zero adaptation and nominal feedback coefficient a1 set to 0.999516 for a nominal sample rate of 60 samples per second. The LPF 230 is a faster LPF, similar to the LPF 220, except that the LPF 230 includes variable coefficients depending on whether its input is less than or greater than its output. A comparator 240 determines which coefficient to select through a multiplexor 250: a1p=0.9854, if the quantity (LPF 230 input minus LPF 230 output) is positive, or a1n=0.99370 if negative. Other coefficients may be used without deviating from the scope of the invention.

The outputs from the LPF 220 and LPF 230 are combined in a combiner 260 using a weighted average by selecting a value for tfw1, as illustrated in FIG. 2. In some embodiments tfw1 can be approximately equal to 0.5. The combined output is created, resulting in the composite filtered differential signal. This resulting composite filtered differential signal is restored to an absolute signal by adding back the intensity scaled white luminance signal 212, which was created by the white processor 210 described above.

Design details of some of the components that may be used to create the temporal surround filter may be found in the Ferguson reference incorporated above, as well as in U.S. Pat. No. 6,976,045 and U.S. Pat. No. 6,907,143 to Ferguson, both of which are incorporated herein by reference.

Example filter details for LPF 220 and LPF 230 are given in Table 2.

TABLE 2

LPF1: Adaptive Lum Filter of U.S. Pat. No. 6,907,143, referred to as temporal surround:
    with adaptation parameters = 0 and
        a1 = 0.999516, b0 = 1−a1
        for sample rate of 60Samples/second.
LPF2: Adaptive Lum Filter of U.S. Pat. No. 6,907,143, referred to as temporal surround:
    with adaptation parameters = 0 and
        a1 = a1n if LPF2 output > LPF2 input, else a1 = a1p:
        a1n = 0.99370
        a1p = 0.9854
        for sample rate of 60Samples/second.

Figure 3:
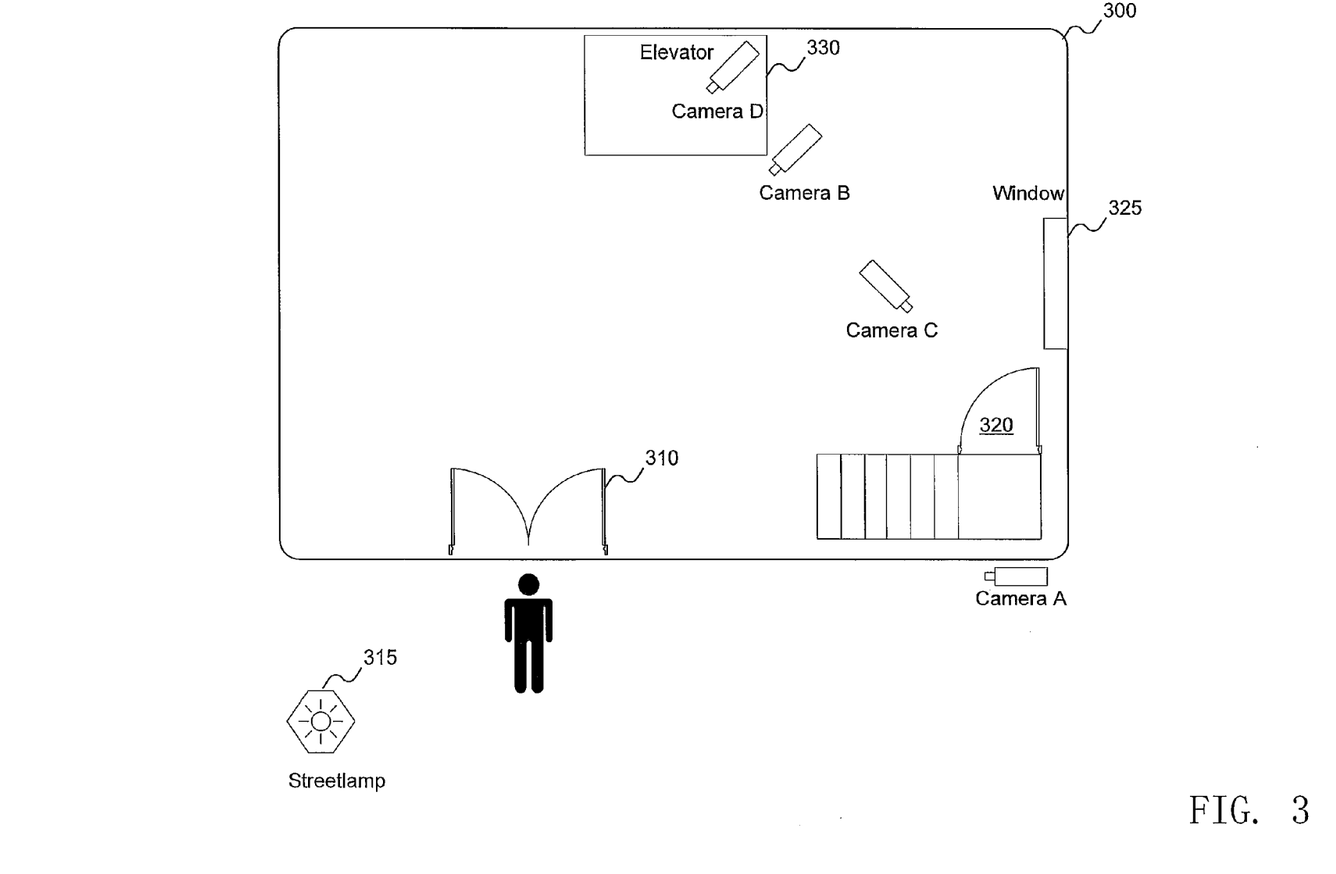
FIG. 3 is a block diagram of an example surveillance system for a building according to embodiments of the invention.

FIG. 3 is a diagram showing a building 300 under surveillance as well as multiple camera positions that operate in conjunction with embodiments of the invention. As described above, video surveillance is only as good as the underlying video signal. One issue affecting quality in the video signal is ambient light conditions, which may be dynamic. Dynamic lighting conditions may include constantly changing daylight, interference from intermittent lights, of various colors and color temperatures, as well as other lighting conditions described below.

In FIG. 3, video cameras are strategically placed around and within the building 300 to monitor happenings in the building. For example, a building manager may want to know who is entering the building, or how many people are in the building at any given time. Using embodiments of the invention such information is tracked more accurately because it automatically compensates for dynamic light and color conditions.

Video camera A is placed outside of building 300 and is strategically placed to record the scene of a front door 310. If a person approaches the building in the direction of the camera, the video surveillance system may be able to automatically detect not only the presence but also the identity of the person approaching. If the person approaches the building with his or her back to the camera A, the automatic identification may be more difficult as facial recognition is most likely unavailable. Object detection would still likely be available, though, even if facial recognition is not. Some surveillance installations may include multiple cameras trained on the same scene from multiple angles. For example there may be cameras placed such that anyone approaching the front door 310 is always facing a camera, so that the surveillance system always has a good view for facial recognition.

One factor affecting the video signal from camera A in FIG. 3 is a streetlamp 315. Generally the streetlamp 315 is only lit at night, of course, but some streetlamps are only lit intermittently in an effort to save energy. Since light from the streetlamp 315 shines on the threshold of the front door 310, the lighting affects the video signal from camera A. If the light is shining brightly, it may well light the face of the person approaching the building 300. In other situations, if the streetlamp 315 is located behind the subject, then the subject's face may be shadowed, and harder to detect. In other cases the streetlamp may turn on or off while the subject is approaching, making the resultant video difficult to analyze. In addition, other light sources such as from red tail lights and/or break lights from vehicles, flashing lights from police, ambulance or other vehicles or fixed alarms, red, green or yellow traffic lights other colored lights neon signs and the like, saturated red, pink, orange, yellow and similar colors from sunrise and sunset may alter the color of the person and/or other objects to be identified.

Within the building 300 are three additional cameras. Camera B captures video data of the inside of the front door 310, and can be used for tracking the number of people entering and exiting the building 300. Camera C is focused on a stairwell 320, and can be used for tracking people using the stairwell to move to another floor within the building 300. For that reason there may be a separate camera C for each floor of the building 300, although only one camera C is illustrated in FIG. 3.

Similar to the streetlamp 315 lighting the threshold of the front door 310, a window 325 is located near the stairwell 320. The overall darkness and lightness of the stairwell 320 changes throughout the day as the sun rises and sets. Light from the moon may also come through the window 325, which could affect the lighting for camera C. Although not shown, the building 300 is lit, of course, and the overall brightness inside the building 300 may be controlled by turning lights on or off. Some lights are set to automatically turn on when it senses a person approaching, and turn off a delayed time after the person is no longer in the area controlled by the light.

Camera D is located within an elevator 330, and may also be used to determine personnel movements within the building 330.

Figure 4:
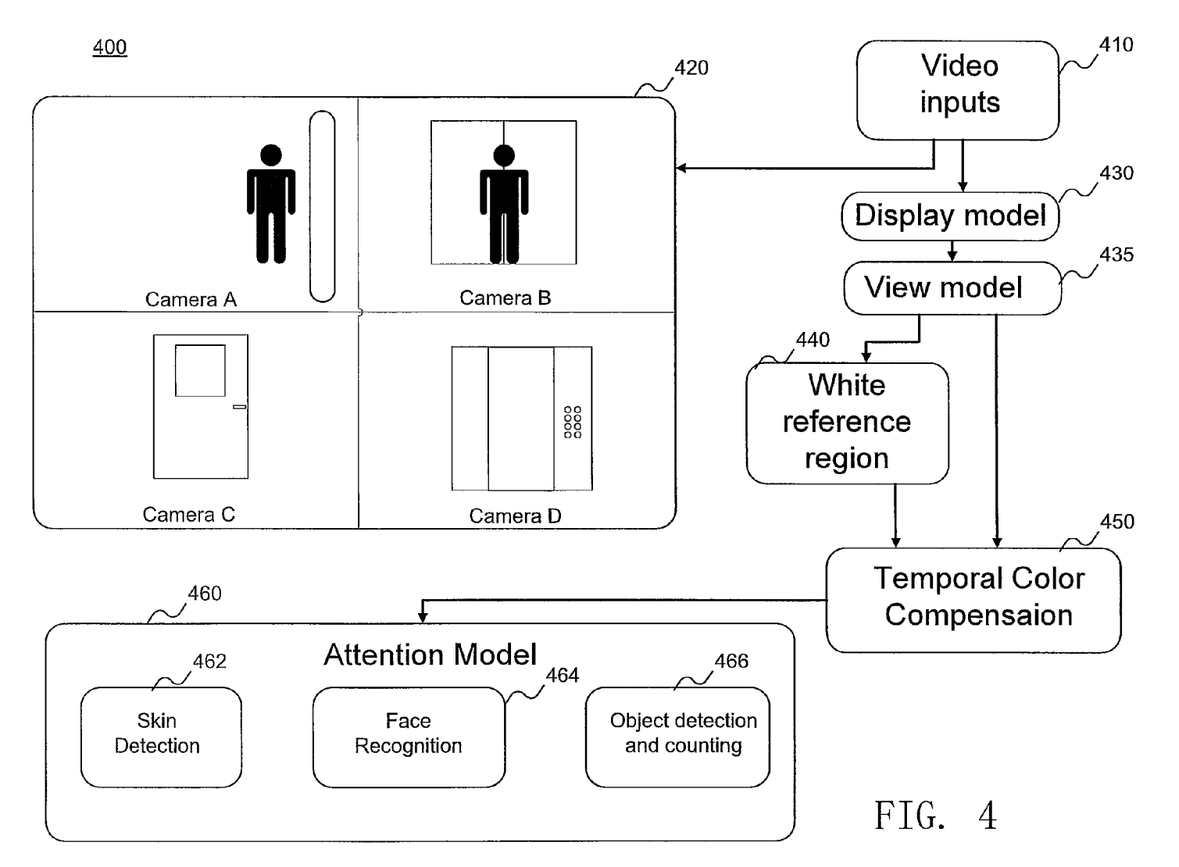
FIG. 4. is a block diagram illustrating example components of a video surveillance system according to embodiments of the invention.

FIG. 4 is a block diagram of an example surveillance system 400 according to embodiments of the invention. The system receives video input 410, which may be, for example inputs from the cameras A-D of FIG. 3. In other embodiments the video input 410 may be from previously recorded sources. The video input 410 is coupled to a video display 420. The video display 420 of FIG. 4 is divided into four sections, one for each of the cameras A-D of FIG. 3, which may either be "live" feed, or may be from recorded video. There may or may not be a live person monitoring the video display 420. Additionally, the video display 420 may be located far from the actual video input 410, and may be transmitted over the Internet or some other data network for remote display and viewing. In some automated systems, the video display 420 need not be present, and no live display of signals from the cameras A-D need be made.

The video input 410 is also coupled to a display model 430, which may be the same or similar to the display model described in FIG. 1. The video input 410 is additionally coupled to a view model 435. Output from the view model 435 is coupled to a white reference region 440. In this region a user selects a particular region of interest in the video signal of the video under test. This region defines an area of the particular video where a reference color is found. In many cases the reference color will be a shade of white, but other colors are also possible. For instance, the reference color can be a portion of a sign, a wall, or another object. Generally this reference is very static apart from changes in illumination. The simulated light from this reference region 440 is input to the temporal color compensation 450, described in detail above with reference to FIGS. 1 and 2. The light from the white reference region 440 may be, for example, used as the "white" reference that is also input to the mix controller 120, as well as the temporal surround filter 130 of FIG. 1. The white reference from the white reference region may be the white portions of the cone color signals Rw, Gw, and Bw. In this manner the color compensation is input into the temporal color compensation component 450, which automatically modifies portions of the modeled video signal so that details may be more easily observed. The temporal color compensation component 430 may also compensate for overall brightness or darkness for automatic surveillance video compensation.

In operation, as the ambient light of the viewfield of the particular camera changes, the white reference region of the video also changes. Recall that the white reference region was pre-designated by a system user. In some embodiments of the invention the white reference region of the video may be detected by analyzing some time period of video and making an average calculation. For instance the system may capture video data for several days or weeks and select a generally static section of the video as its white reference. Then, as the ambient light changes within the video data, for instance by daylight ending or a street lamp turning on, or other change in light, the white reference region 440 modifies the color data output. This in turn is fed to the temporal color compensation component 450, which modifies the color data so that the most detail can be generated from the original video signal.

The output from the color compensation component 450, which is the automatically color compensated video, is then fed to an attention model 460, as illustrated in FIG. 4. Prior art may be used to convert output units of 450 to the required inputs of 460. In some embodiments, the output of 450 is standard RGB or YUV digital video through the use of the inverse color appearance model as specified by CIECAM02, using a standard illuminant white specified as D65, the {a,b} output and an approximation of L using the view model Y or luminance output. In another embodiment, the attention model may take the Y or luminance portion of the view model together with the {a,b} portion of the temporal color compensation output together as input. The attention model 460 includes a skin detection component 462, a face recognition component 464, as well as an object detection and counting component 466. In some embodiments the attention model 460 is coupled back to control of the cameras that are connected to the video inputs 410 to control zoom and pan features.

Using the color compensated signal, the face recognition component 464 is able to detect facial features in lighting conditions where it was once not possible. For instance, the temporal color compensation component 450 may allow additional detail to be detected from an otherwise darkened face.

Similarly, the object detection and counting component 466 may be able to detect particular objects, such as people, with much greater accuracy due to the temporal color compensation component 450. In another example the video surveillance system 400 may be set to track packages of a particular color as they come off an assembly line. As the ambient light in the factory changes, the white reference region 440 continuously updates the reference color and passes it to the temporal color compensation component 450, allowing the surveillance system to discriminate between certain color packages.

Finally, the skin detection component 462 works similarly to the other components of the attention model 460 described above. Because of the greater color consistency of surveillance systems using temporal color compensation, the surveillance system 400 is better able to track the color of human skin. When connected with the object detection and counting component 466, the surveillance system 400 can count personnel entering and leaving the building 300 with greater accuracy than previous systems. For instance, the temporal color compensation component 450 may allow a face or other skin which appears green or brightly saturated red to be correctly classified by shade, potentialy used to 1) identify skin as parts of a human for identifying people and 2) identify and classify specific shades and types of skin as part of a system which recognizes people.

Figure 5:
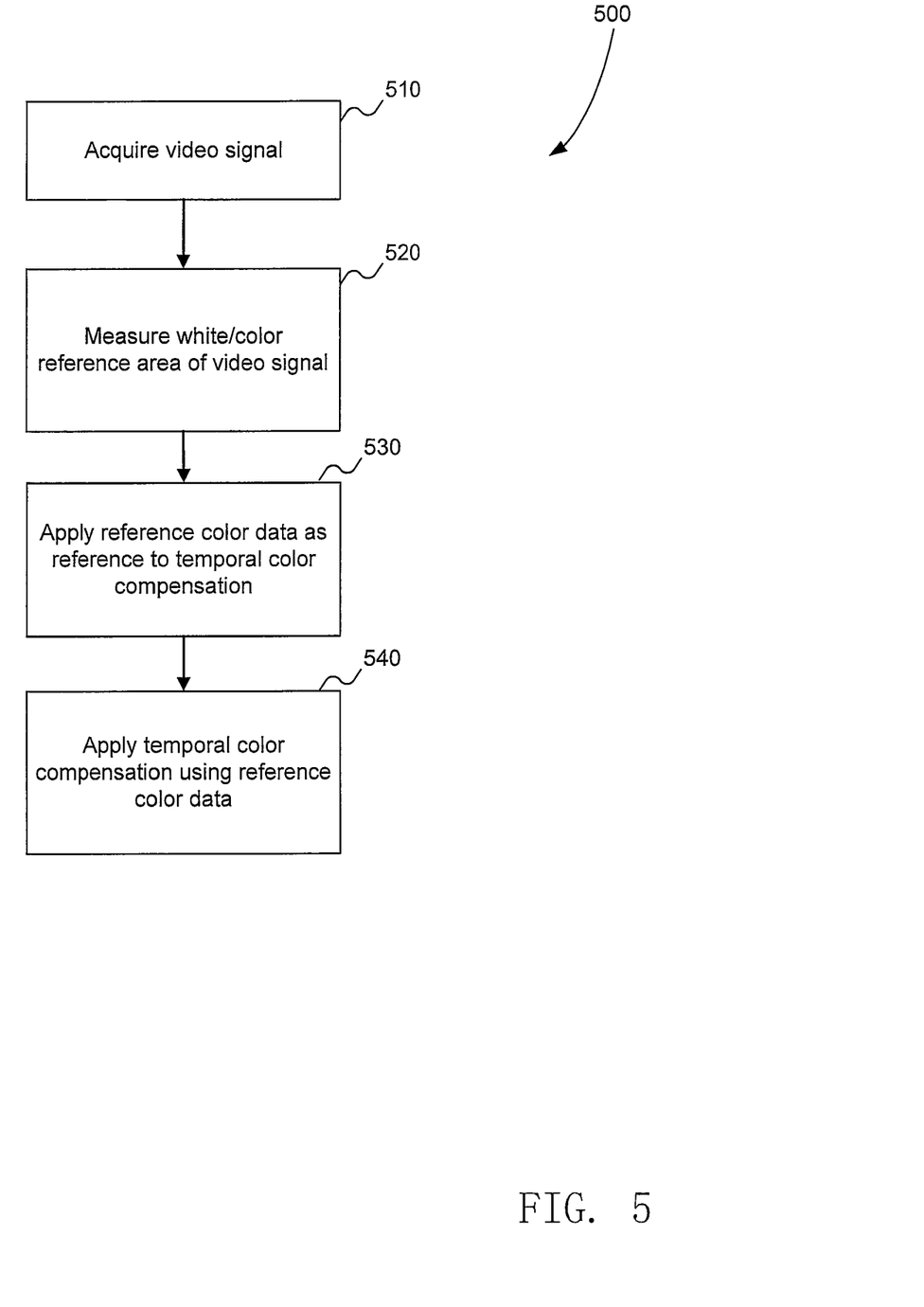
FIG. 5 is an example flow diagram of methods of temporal color compensation according to embodiments of the invention.

FIG. 5 is an example flow diagram illustrating processes used in embodiments of the invention. A flow begins at 510 with video signal acquisition, from, as described above, either a live camera, stored video, or some other source. The video signal is passed to a white/color reference process 520 that measures the color data of a reference section of the video. The reference section is a pre-defined area of the video signal that typically includes a static, and typically white, grey or at least approximately achromatic reference where color can be measured as the ambient lighting changes over time.

In a process 530 the measured color data from the video signal is input as a reference color to a temporal color compensation processor. With reference back to FIG. 1, the measured color data may be substituted for the "white" signal input to the temporal processor 130. The process 540 may describe the action of the temporal processor 130 of FIG. 1, which modifies the output of the video signal so that the signal is a more constant signal, over time, regardless of the dynamic lighting conditions of the subjects under surveillance. In some embodiments, the spatiotemporal filters may be missing, in part or in total, or may be substituted with different coefficients or entirely different filter implementations. In the preferred embodiment, the control parameters are set for global adaptation and the reference region white input.

Although particular embodiments have been described, it will be appreciated that the principles of the invention are not limited to those embodiments. Variations and modifications may be made without departing from the principles of the invention as set forth in the following claims.

What is claimed is:

1. A method of automatic object detection in video comprising:
   receiving a video signal at a video input, the video signal including objects lit under varying lighting conditions;
   measuring a color of a reference area within the video signal;
   providing the measured color as a color reference input to a color processor; and
   adjusting a color signal of data generated from the video signal using the measured color by accepting from a user a first weighting value of how locally or globally to apply the measured color, by accepting from the user a second weighting value of how much to apply a spatial surround filter to data generated from the video signal, and by allowing the user to control how much effect to apply to the data generated from the video signal based on the first weighting value and the second weighting value.

2. The method of automatic object detection according to claim 1 in which measuring a color of a reference area within the video signal comprises measuring a white signal of the reference area.

3. The method of automatic object detection according to claim 2 in which measuring a white signal comprises calculating a white value from two or more color separated signals.

4. The method of automatic object detection according to claim 1, further comprising detecting human objects using the adjusted color signal and a human-skin color reference.

5. The method of automatic object detection according to claim 4, in which the human-skin color reference is a plurality of different skin color references.

6. The method of automatic object detection according to claim 1, further comprising classifying human objects using the adjust color signal and a human characteristic database.

7. The method of automatic object detection according to claim 1, further comprising keeping a present count of a number of persons within a building under surveillance.

8. A method of face detection, comprising:
   receiving a video signal at a video input, the video signal including one or more human faces lit under varying lighting conditions;
   measuring a color of a reference area within the video signal;
   providing the measured color as a color reference input to a color processor; and
   adjusting a color signal of data generated from the human faces of the video signal using the measured color by accepting from a user a first weighting value of how locally or globally to apply the measured color, by accepting from the user a second weighting value of how much to apply a spatial surround filter to data generated from the video signal, and by allowing the user to control how much effect to apply to the data generated from the video signal based on the first weighting value and the second weighting value.

9. The method of face detection according to claim 8 in which measuring a color of a reference area within the video signal comprises measuring a white signal of the reference area.

10. The method of face detection according to claim 9 in which measuring a white signal comprises calculating a white value from two or more color separated signals.

11. The method of face detection according to claim 8, further comprising associating one or more faces from the adjusted color signal with one or more stored facial identities.

12. A system for automatic object detection, comprising:
   a video input structured to accept a video signal;
   one or more video models structured to generate video data from the video signal;
   a color reference generator structured to abstract color data from a pre-selected portion of the video data;
   a spatial center filter structured to modify the video data;
   a spatial surround filter structured to modify the video data;
   a first mixer having inputs coupled to a white value input extracted from the video signal and to an output of the spatial surround filter, and having an output, the first mixer further having a first mixing control structured to accept a first mixing input from a user;
   a second mixer having inputs coupled to the output of the first mixer and to an output of the spatial center filter, and having an output, the second mixer further having a second mixing control structured to accept a second mixing input from a user;
   a temporal processor structured to modify the video data over time using color data abstracted from the color reference generator and depending on the first mixing input and the second mixing input; and
   an object detector coupled to the temporal processor and structured to compare the modified video data against pre-stored object criteria.

13. The system of claim 12 in which the color reference generator produces a different output when ambient lighting within the video signal changes.

14. The system of claim 12 in which the pre-selected portion of the video data is a portion of a wall.

15. The system of claim 12, in which the color reference generator is an automatic color reference generator.

16. The system of claim 15 in which the automatic color reference generator is structured to determine a target area of the video signal that has relatively fewer changes over time as compared to other portions of the video signal, and to use the determined target area as the pre-selected portion of the video data.

17. The system of claim 12 in which the color reference generator is formed from white components of a set of cone responses of the video signal.

18. The system of claim 12 in which the object detector comprises a facial recognition database, and in which the pre-stored object criteria are facial features.

19. The system of claim 12 in which the object detector comprises a skin detector, and in which the pre-stored object criteria include human identifying information.

20. The system of claim 12 in which the object detector comprises an object counter structured to count a number of pre-defined objects that appear on the video signal.

* * * * *